May 6, 1958
H. ALLEN ET AL
2,833,510
VALVE MECHANISM
Filed April 4, 1955
3 Sheets-Sheet 1
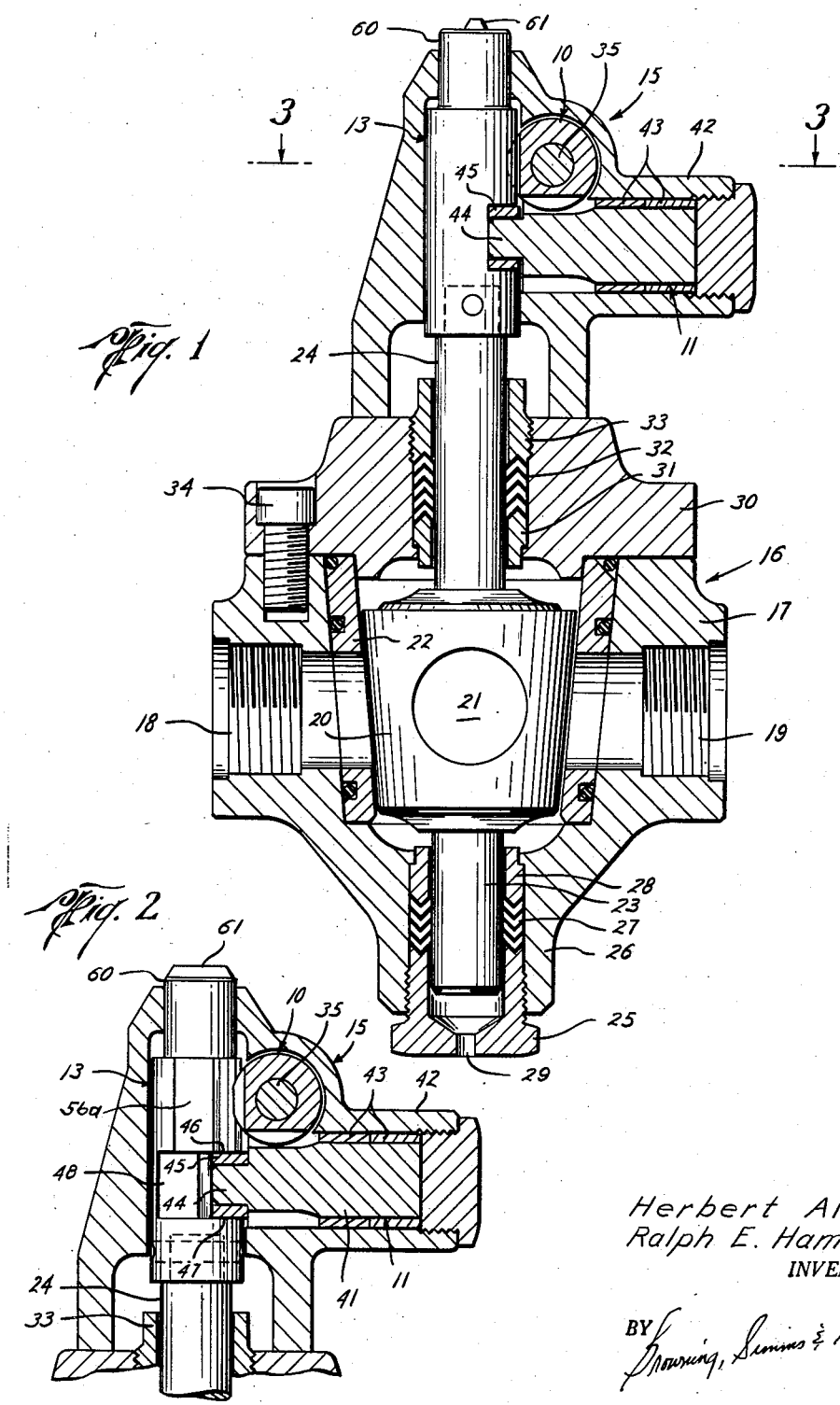
Herbert Allen
Ralph E. Hammond
INVENTORS
BY Browning, Simmons & Hyer
ATTORNEYS

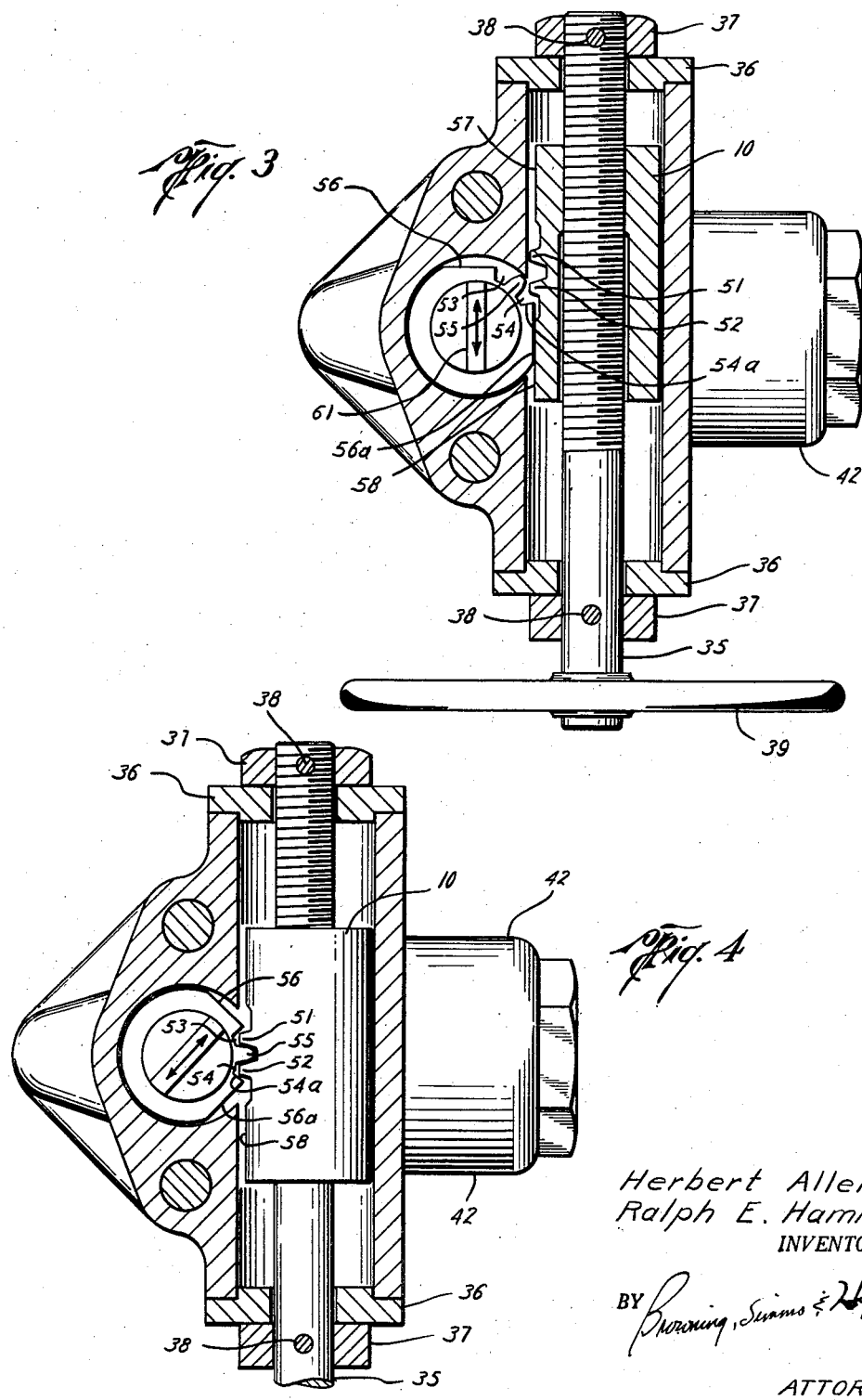

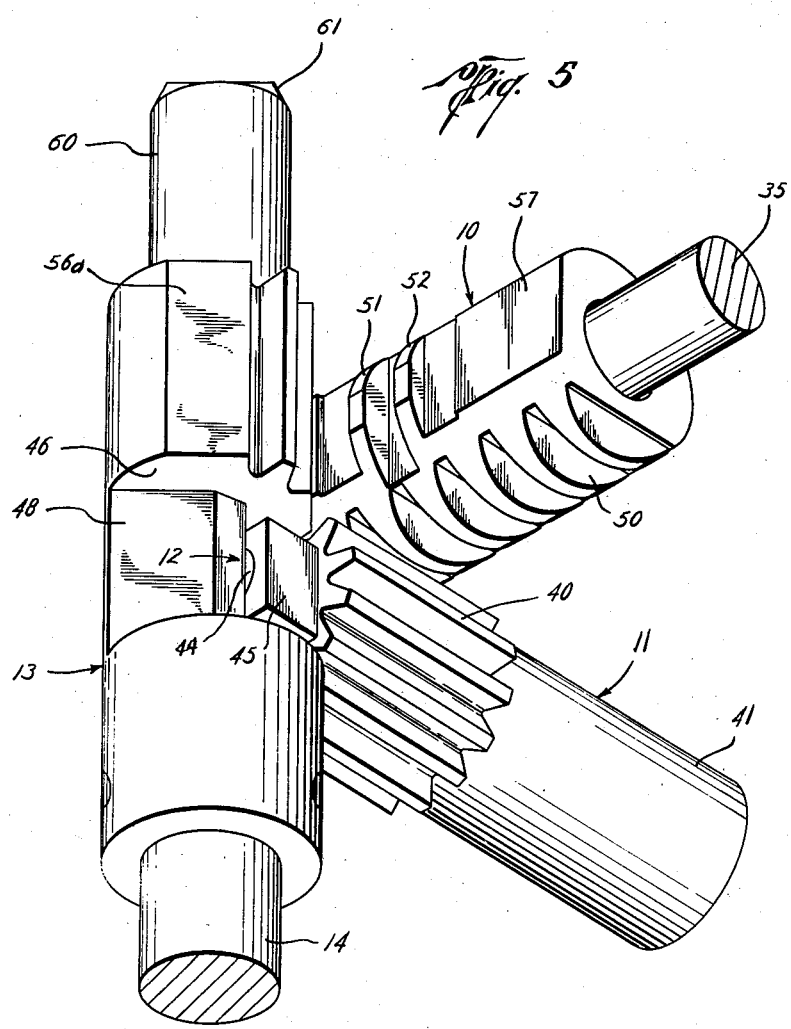
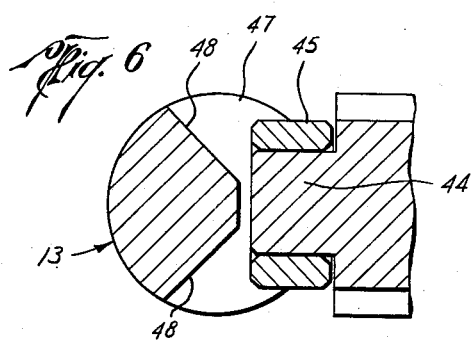
Herbert Allen
Ralph E. Hammond
INVENTORS
ATTORNEYS

United States Patent Office 2,833,510
Patented May 6, 1958

2,833,510

VALVE MECHANISM

Herbert Allen and Ralph E. Hammond, Houston, Tex., assignors to Cameron Iron Works, Inc., Houston, Tex., a corporation of Texas Application April 4, 1955, Serial No. 498,922

10 Claims. (Cl. 251—162)

This invention relates to an improved actuating mechanism for a valve of the type wherein a valve member is moved endwise from seated position, rotated and then moved back to seated position. In one of its aspects, it relates to an actuating mechanism wherein one longitudinally movable element coordinates rotary movement of two rotary elements which are connected to a stem to respectively rotate and reciprocate the stem.

The unseat, turn and reseat type of actuation for a valve member, particularly that of a plug valve, is desirable because the valve member is difficult to turn between open and closed positions if it is caused to remain in seated position during turning. This is particularly true where the valve member and seat are not to be lubricated or are tapered or frusto-conical in shape. Further, turning of the valve member while it remains seated, especially when the valve is handling a gritty fluid, frequently causes scoring of the valve member or its seat with grooves which eventually cause the valve to leak. By lifting the valve member either prior to or during its rotation, such scoring is reduced to a minimum and that which does occur is in a direction towards the ends of the plug valve member and its seat thereby reducing the likelihood of a score causing leakage. Various mechanisms have heretofore been suggested or devised to provide this type of actuation for the valve member and each of these mechanisms have involved one or more disadvantages among which are: (1) they are unduly complicatd in nature, such as those employing reversing nut arrangements for causing reciprocatory movement of the valve member; (2) they are somewhat difficult to operate because of excessive torque requirements; (3) they are not operable in a manner to simulate the normal movements employed to operate a valve; and (4) they involve arrangements of parts such that to obtain the necessary sequential movement of the valve member, close valve-to-actuator tolerances (stacking tolerances) have to be maintained. Thus, in some actuator mechanisms, the rotational and endwise movements of the valve member must terminate at the same time and hence the stacking tolerance must be small in order that the valve member will be firmly seated at the time it stops rotating. In other actuator mechanisms, the valve member is moved endwise both before and after it rotates thereby increasing the permissible stacking tolerance. However, such tolerance is still limited because the mechanisms cannot be designed to permit any relatively large variations in endwise movements of the valve member before or after rotating without excessive sacrifice of mechanical advantage. In other words, the degree of permissible endwise movement caused by such mechanisms before or after rotation of the valve member can be increased to increase the stacking tolerance only by changing the overall mechanical advantage provided by the actuating mechanisms since the portion of the total operating cycle which is devoted to rotation is inherently fixed by the nature of the parts causing rotation. It would be desirable, therefore, to possess a valve actuating mechanism in the design of which the stacking tolerance could be varied by varying the portion of the operating cycle devoted to rotation.

It is therefore a general object of this invention to provide a valve actuating mechanism particularly adapted for use on a plug valve of the class described wherein the mechanism is simple, rugged, inexpensive and easily operated and wherein the parts can be easily arranged to accommodate large stack-up tolerances between the valve and actuating mechanism.

Another object of the invention is to provide a simple valve actuating mechanism in which a single longitudinally movable element is employed to coordinate or to drive two rotatable elements respectively imparting rotational and endwise movement to the stem and in which the ratio between the portion of such element's movement during rotation of the stem and its movement during endwise movement of the stem can be varied between wide limits and yet a desired degree of rotational and endwise movements of the stem can be obtained.

Another object is to provide a valve actuating mechanism employing rack and pinion means for imparting not only rotational movement to the stem but also an endwise movement thereto first in one direction and then in an opposite direction while the rack and pinion means are moved in a single directional sense, all without complicated gearing or reversing nut arrangements.

Another object is to provide a valve actuating mechanism employing a rack-like element to coordinate movement between two pinion-like elements in such a manner as to impart a positive and predetermined sequential endwise and rotational movement to a valve stem, said mechanism being susceptible of arrangement so that the stem can be moved endwise a relatively large distance before or after it has rotated to thereby increase the permissible stacking tolerance between a valve and the mechanism and yet any reasonably desirable mechanical advantage can be provided by the mechanism to operate the valve.

Another object is to provide a valve actuating mechanism in which a common rack-like member controls relative rotation between a first pinion for rotating the valve stem and a second pinion directly connected to the stem through an eccentric connection to impart endwise reciprocatory movement to the stem upon rotation of the pinion in a single direction, the rack being driven by a screw to thereby afford a high mechanical advantage even though the throw of the eccentric connection is made relatively large or the size of the second pinion is made relatively small to reduce the rack travel.

Another object of the invention is to provide a valve actuating mechanism in which movement of a rack in a single direction rotates a pinion connected by an eccentric to the stem to thereby impart reciprocatory movement to the stem and during such travel, the rack discontinuously drives another pinion carried by the stem to rotate the same.

Other objects, advantages and features of the invention will be apparent to one skilled in the art upon a consideration of the written specification, the appended claims and the attached drawings wherein:

Fig. 1 is a vertical view, partially in section, of a valve embodying the invention, the parts of the mechanism being shown with the valve member in closing position but lifted from its seat;

Fig. 2 is a view of the actuating mechanism illustrated in Fig. 1 except that the parts are shown in the position they occupy with the valve member seated and in open position;

Fig. 3 is a view taken on the line 3—3 of Fig. 1;

Fig. 4 is a view similar to Fig. 3 except that the parts of the actuator mechanism are shown in the position they occupy during rotation of the valve stem;

Fig. 5 is an isometric view of certain parts of the actuator mechanism to better illustrate the interaction therebetween, the parts being in the position they occupy when the valve member has been moved to seated and open position; and Fig. 6 is a partial cross-sectional view of the eccentric employed for moving the stem endwise, the parts being shown in their positions when the stem is intermediate its rotational extremes.

Like characters of reference are used throughout the several views to designate like parts.

Before turning to a detailed disclosure of the apparatus of this invention, it may be pointed out that generally the valve actuator illustrated in the drawings comprises a longitudinally movable member 10, herein termed a rack, having a connection with rotatable lifter 11 connected, via an eccentric in the form of a pin means 12 and a follower 13, to stem 14 so that rotation in one direction of the lifter imparts an endwise reciprocatory movement to the valve stem. Rack 10 also has a connection with the follower and stem such that while the rack is thus moving endwise to rotate the lifter, it can, through all or a predetermined portion of such movement, act through the follower to rotate the stem. Accordingly, it will be seen that the rack acts as a bridging connection between a pinion part on the follower and another pinion part on the lifter which is eccentrically connected to the follower in such a manner that when an input force is applied to the rack, the desired endwise reciprocatory and rotative movements are imparted to the follower and hence to the stem and these movements are maintained in a definite sequence by a single longitudinally movable element.

Turning now to a more detailed discussion of the structure illustrated in the drawings, the actuator mechanism 15 is illustrated as mounted upon a two-way plug valve 16. Thus, the valve can have a body 17 provided with flow ports 18 and 19 through which flow is controlled by rotation of a plug valve member 20 to place passage 21 therein in and out of flow alignment with the flow ports. Preferably, the plug valve member seats upon a removable seat ring 22 having openings aligned with the two flow ports. The seat ring and plug valve member are both tapered, i. e., frusto-conical, and while the taper has been shown to be upwardly and outwardly in the drawings, it can be reversed to be downwardly and outwardly.

The plug valve member is mounted within the valve body for rotation and limited endwise movement on a common axis. This may be accomplished by providing the valve member with extensions or stems 23 and 24. Stem 23 has a sealed journal and stuffing box arrangement provided by gland 25 in boss 26, packing 27 and a shouldered bushing 28. An opening 29 can be provided through the gland to expose the lower end of stem 23 to atmospheric pressure and thereby at least in part reduce endwise thrust on the plug valve member exerted by pressure of fluid being handled by the valve.

Upper stem 24 also has a sealed journal carried by bonnet 30 and, similar to the lower journal, comprises a shouldered bushing 31 seated against a shoulder in the bonnet, packing 32 and a gland ring 33. The bonnet can be secured to the valve body by a plurality of cap screws 34. The packings 27 and 32 may be of V-type rings or other types of packing and compression thereof is adjustable by glands 25 and 33.

It will be apparent from the foregoing that since the upper end of the plug valve member is spaced from the bonnet and is tapered upwardly and outwardly in frusto-conical fashion, it can be, by application of proper forces to stem 24, unseated by movement upwardly endwise, rotated, and then moved downwardly endwise to reseated position. The plug valve member is, of course, maintained in proper axial alignment with seat ring 22 by stems 23 and 24 and their cooperating journals. It will be noted that while a two-way valve has been specifically illustrated in the drawings, and while the plug valve member of the illustrated valve is rotated 90 degrees between its two operational positions, the valve can be of a type having more than two ports and in which the plug valve member is rotated more or less than 90 degrees to thereby provide three-way, four-way, etc., valves. By this it is meant to say that the actuating mechanism of this invention can, by a simple orientation or change in size of its parts, be made to operate a plug valve of any particular type or style as long as the plug valve member is mounted for rotational and endwise movement.

As indicated above, the actuating mechanism of this invention generally comprises a longitudinally movable member interconnecting two rotatable members. One of the rotatable members is directly connected to the stem to rotate it while the other is connected to the stem through an eccentric to impart endwise reciprocatory movement to the stem, first in one endwise direction and then in an opposite direction, during continued movement of the eccentrically connected member and of the longitudinally movable member in a single directional sense. For the illustrated embodiment of the actuating mechanism, the longitudinally movable member comprises the rack 10 threadedly connected to an input shaft or screw 35 so that rotation of the shaft causes the rack to move longitudinally in a direction transversely to the rotational axis of the stem and the lifter 11. The input shaft is mounted for rotation on the actuator housing by means of end caps 36 and is prevented from moving axially by collars 37 pinned to the shaft by pins 38. One end of the shaft can carry an operating wheel 39 or other suitable means for applying torque to rotate the shaft.

As possibly shown best in Fig. 5, the connection between the rack and stem 14 for imparting reciprocatory endwise movement to the latter includes lifter 11 on which a pinion 40 is formed and which also includes a stub shaft 41. The latter is journaled for rotation in an extension 42 of the actuator housing by means of bearings 43. The lifter is thus mounted with its rotational axis transversely to the rotational axis of the stem and the longitudinal axis of the rack and is illustrated with its axis disposed normal to the axes of the stem and rack. An eccentric is provided connecting the lifter with the stem so that rotation of the lifter in one direction reciprocates the stem by moving it first in one endwise direction and then in the other. The eccentric includes a pin means 12 and a follower 13. The pin means can comprise a pin 44 disposed eccentrically of the axis of rotation of stub shaft 41 and pinion 40 and rotatably received in a shoe 45. The shoe bears against opposing endwise follower faces 46 and 47 which are parallel to each other and disposed in planes normal to the rotational axis of the follower and stem. As shown, these faces are defined by a slot cut in the follower and as will be seen in Fig. 6, the slot is cut so that the follower can rotate without the eccentric pin 44 or shoe 45 binding against the vertically disposed surfaces 48 thereof. In this manner, the shoe can slide along faces 46 and 47 as the stem rotates and yet apply forces to the faces to move the stem endwise. Preferably, faces 46 and 47 are spaced apart such that both always bear against shoe 45 to prevent any lost motion between the follower and pin means.

One side of rack 10 is provided with teeth 50 adapted to mesh with the teeth of pinion 40 and thereby provide a rotary driving connection between the rack and the lifter. The rack also has a rotary driving connection with the stem which is preferably discontinuous so that the stem is rotated only during an intermediate portion of the rack's travel in one direction or the other. Thus, another side of the rack is provided with teeth 51 and 52 adapted to cooperate with a partial pinion formed as a part of the follower by providing it with recesses 53 and 54 and a tooth 55. The follower also has locking flats 56 and 56a adapted to be alternately and respectively engaged by corresponding locking flats 57 and 58 on the rack to thereby prevent rotation of the follower while the rack is moving through those portions of its movement adjacent the termini of its travel.

With such arrangement, movement of the rack toward the wheel end of shaft 35 causes flat 58 to slide by flat 56a until tooth 52 enters recess 54 and engages an end 54a thereof to begin turning follower 13. Continued movement of the rack causes tooth 51 to enter recess 53 and engage tooth 55 to continue rotation of the follower. Still further movement of the rack will cause tooth 51 to disengage from the follower and flat 56 to be disposed opposite flat 57 so that the rack can continue to travel. Movement of the rack in an opposite direction will, of course, cause reverse rotation of the follower to take place.

The actuating mechanism is illustrated in several of its operative positions in Figs. 1 through 5. Initially, with the plug valve member in closed position and seated, the rack is at the end of its path of travel farthest from wheel 39. In such position, flats 56a and 58 are opposite each other and the pin means is acting through the follower and stem to urge the plug valve member to seated position. Then as shaft 35 is rotated to move the rack in a direction toward the wheel end of the shaft, it drives pinion 40 in a direction such that eccentric pin means 12 is moved about the rotational axis of lifter 11 in an upward direction to lift the plug valve member from its seat. During such initial movement, flats 56a and 58 of the follower and rack remain in engagement preventing rotation of the follower and stem. See Figs. 1 and 3. As rotation of shaft 35 continues, the rack is moved endwise to cause tooth 52 thereon to engage end 54a of recess 54 and thereby start rotation of the follower and stem. As the rack continues moving, tooth 51 will engage tooth 55 to continue rotation of the follower until it has been turned to position flat 56 parallel to flat 57 (Fig. 5). During the rotation of the follower, pin means 12 has been moved by the rack and pinion 40 through the zenith of its eccentric movement and through a portion of its downward movement to move the stem in a direction to reseat plug valve member 20. For the illustrated structure, the pin means moves through the zenith of its position at a time when the follower and stem have been moved halfway between the extremes of their rotational positions as shown in Figs. 4 and 6. Accordingly, endwise movement of the follower and stem is at a rate, during rotation thereof, which gradually decreases as the follower and stem move to their halfway rotational point whereupon the endwise movement is reversed in direction. Thereafter, as the follower and stem complete the remaining half of their rotation, the rate of endwise movement of the plug valve member toward reseated position increases.

After the follower and stem have been rotated, flats 56 and 57 are positioned parallel to each other to prevent the follower and stem from rotating further and the teeth 50 on the rack continue to rotate pinion 40. During such rotation, pin means 12 is moved downwardly to impart the remaining downward movement to the follower and stem necessary to reseat the plug valve member in open position as shown in Fig. 2.

For any given amount of plug valve movement axially off from its seat, the length of the rack's travel will be dependent upon the amount of eccentricity of pin 44 with respect to the rotational axis of the lifter and the effective diameter of pinion 40. By making the eccentricity as large as feasible and the diameter of the pinion small, the rack travel can be minimized so as to permit a reasonably sized actuator mechanism. This, of course, would result in a relatively low mechanical advantage from the rack to the stem but this is compensated by the high mechanical advantage obtainable between shaft 35 and the rack. On the other hand, the portion of the rack's total travel devoted to rotation of the valve member can be varied by changing the effective diameter of the partial pinion on the follower. Such a change does not involve any change in the required rack travel for moving the valve member axially of its seat.

With the flexibility of design as just indicated, it is possible to make the permissible stacking tolerance quite large. Thus, the eccentric and pinion 40 can be sized so that the eccentric pin need normally move only through an arc sufficiently small that, even when the actual stack-up distance is overly large in any particular instance, there is no danger of the eccentric pin reaching bottom dead center before the valve member is seated. At the same time, the size of the partial pinion can be adjusted so that the required valve member rotation occurs well within the expected minimum rack travel.

It might also be noted that the actuating mechanism prevents the valve member from moving toward unseated position due to vibrations or unbalanced pressure on the valve member urging it endwise to tend to drive the actuating mechanism. This is prevented by the high mechanical advantage obtaining from shaft 35 to the rack due to the threaded connection therebetween. This is particularly advantageous when the lifter is designed to rotate only about 180 degrees because the mechanical advantage from the lifter to the stem, when the lifter is at or adjacent the termini of its rotational movements, is low relative to the said advantage when the lifter is intermediate its rotational termini. Accordingly, the valve member could then be jarred or pressured from seated position, were it not for the high mechanical advantage of the shaft, much more easily than would be the case if the lifter had been designed to rotate 270°, for example.

It is possible that shaft 35 can drive pinion 40 instead of the rack as by providing a worm thereon engaging a worm wheel formed as a part of stub shaft 41. This is not as preferable as the rack drive because of the increased manufacturing cost in forming the worm and worm wheel arrangement and in providing a separate mounting for the rack.

It will be noted that one end 60 of follower 13 is extended beyond the actuator housing and bears an arrow 61 or other indicia thereon indicating the open and closed positions of the plug valve member. It is also contemplated that the actuator housing can be in bearing engagement with the upper side of the rack and the lower side of pinion 40 to aid in supporting the lifter as it applies endwise forces to the follower in moving the latter endwise.

It will further be noted that the length of flats 56 and 56a and that of recesses 53 and 54 and of tooth 55 in a direction axially of the follower is sufficient that these parts can move axially with the follower without becoming positioned such that they can no longer properly cooperate with the rack. Also, the rack is prevented from rotating on its longitudinal axis by its engagement with pinion 40 and with the follower.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The claims having been described, what is claimed is:

1. A valve actuator mechanism for causing rotational and limited reciprocatory endwise movement of a stem about and along an axis of the stem comprising, in combination with said stem, a rotatable pinion, an eccentric connecting between the pinion and stem causing reciprocation of the stem first in one endwise direction and then in an opposite endwise direction upon continued rotation of the pinion in one direction, a rack engaging the pinion, and a rotary driving connection between the rack and stem causing rotation of the stem during at least a portion of the rack's movement, and means for driving the rack and pinion.

2. The mechanism in claim 1 wherein said driving means comprises a rotatable shaft having a threaded connection with the rack such that a sufficiently low mechanical advantage is provided from the stem through the pinion to the rack to prevent the stem from driving the rack.

3. The apparatus of claim 2 wherein said rotary driving connection between the rack and stem is discontinuous to cause interrupted rotation of the stem during said continued rotation of the pinion.

4. A valve actuator mechanism for causing rotational and limited reciprocatory endwise movement of a stem about and along an axis of the stem comprising, in combination with said stem, a rack, a first pinion carried by the stem for driving engagement with the rack to rotate the stem, a second pinion also having driving engagement with said rack and rotatable about an axis transverse to the rotational axis of the stem, an eccentric connecting between the second pinion and stem to move the stem first in one endwise direction and then in an opposite endwise direction during continued rotation of the second pinion in one direction, and means for driving the second pinion and rack.

5. A valve actuator mechanism for causing rotational and limited reciprocatory endwise movement of a stem comprising, in combination with said stem, a first pinion coaxially carried by the stem, a second pinion rotatable about an axis transverse to the rotational axis of the stem, an eccentric connecting between the second pinion and stem to move the stem first in one endwise direction and then in an opposite endwise direction during continued rotatio of the second pinion in one direction, and a rack engaging both the first and second pinions so as to form a bridging connection therebetween and thereby positively coordinate relative rotational movements of the first and second pinions in respectively rotating and reciprocating said stem.

6. The apparatus of claim 5 in combination with a drive shaft threadedly engaging the rack to move it endwise and drive the first and second pinions, the mechanical advantage from the rack to the drive shaft being sufficiently low as to prevent the stem from driving the rack through one of said pinions.

7. The apparatus of claim 5 wherein the rotary driving engagement of the rack with the first pinion is interrupted at the ends of the rack's travel so that the stem is rotated during only an intermediate portion of the rack's travel.

8. A valve actuator mechanism for causing rotational and limited reciprocatory endwise movement of a stem comprising, in combination with said stem, a first pinion co-axially carried by the stem, a second pinion rotatable about an axis transverse to the rotational axis of the stem, pin means carried by the second pinion eccentrically of the rotational axis of the second pinion, follower parts on the stem engaging said pin means so that during continued rotation of the second pinion in one direction, the pin means imparts movement to the stem first in one endwise direction and then in an opposite endwise direction, a rack in driving engagement with both the first and second pinions to rotate the same responsive to the longitudinal movement of the rack, the driving engagement between the rack and first pinion being interrupted at the end portions of the rack so that the first pinion is driven by the rack at only an intermediate portion thereof, and a rotatable shaft threadedly engaging the rack and causing movement thereof responsive to rotation of the shaft whereby movement of the rack in a single direction causes rotational movement of the first and second pinions to move the stem endwise, rotate it and then move it endwise back to its original endwise position.

9. A valve actuator mechanism for causing rotational and limited reciprocatory endwise movement of a stem comprising, in combination with said stem, a rotatably mounted first member, an eccentric connecting the first member and the stem to impart movement to the stem first in one endwise direction and then in an opposite endwise direction during continued rotation of the first member in one direction, a second member mounted for longitudinal movement in a direction transversely to both the rotational axes of the stem and the first member, and rotary driving connections between said second member and each of said first member and said stem so that longitudinal movement of the second member imparts rotational movement to the stem and actuates the eccentric to impart reciprocatory endwise movement to the stem.

10. A valve actuator mechanism for causing rotational and limited reciprocatory endwise movement of a stem comprising, in combination with said stem, a member movable endwise in a direction transverse to the rotational axis of the stem and having a rotary driving connection with the stem to rotate the same during at least a portion of the member's endwise movement in one direction, an element mounted for rotation on an axis transverse to both the rotational axis of the stem and the direction of movement of the member, an eccentric connecting the element and the stem to reciprocate the stem upon continued rotation of the element in one direction, driving means for driving the element and member, and a connection between said element and member causing concomitant longitudinal movement of the member and said continued rotation of the element responsive to actuation of the driving means.

References Cited in the file of this patent

UNITED STATES PATENTS

| | | |
|---|---|---|
| 159,746 | Beckett | Feb. 16, 1875 |
| 1,040,465 | Traylor | Oct. 8, 1912 |
| 1,679,081 | Haneberg | July 31, 1928 |
| 1,894,196 | Reed | Jan. 10, 1933 |
| 2,125,810 | Reed | Aug. 2, 1938 |
| 2,544,090 | Jacobsen | Mar. 6, 1951 |
| 2,646,685 | Willitts | July 28, 1953 |